FLAT WIRE CONVEYOR BELT HAVING SLOTTED BAR LINKS

Original Filed Dec. 1, 1967 2 Sheets-Sheet 1

FLAT WIRE CONVEYOR BELT HAVING SLOTTED BAR LINKS

Original Filed Dec. 1, 1967 2 Sheets-Sheet 1

United States Patent Office

Re. 27,690
Reissued July 3, 1973

27,690
FLAT WIRE CONVEYOR BELT HAVING SLOTTED BAR LINKS

Gerald C. Roinestad and John F. Rodman, Jr., Winchester, and John S. Burnett, Front Royal, Va., assignors to Ashworth Bros. Inc., Fall River, Mass.

Original No. 3,439,795, dated Apr. 22, 1969, Ser. No. 687,205, Dec. 1, 1967. Application for reissue July 29, 1970, Ser. No. 59,229
Int. Cl. B65g *15/30*
U.S. Cl. 198—193 24 Claims

Matter enclosed in heavy brackets [ ] appears in the original patent but forms no part of this reissue specification; matter printed in italics indicates the additions made by reissue.

ABSTRACT OF THE DISCLOSURE

A flat wire conveyor belt comprising: a plurality of slotted tractive links, a plurality of tractive cross pins for interconnecting the tractive links, and a plurality of slotted bar links positioned adjacent the edges of the belt and connected thereto by the cross pins for carrying most of the tractive load of the belt as it travels around lateral curves.

BACKGROUND OF THE INVENTION

Field of the invention

This invention relates to a flat wire conveyor belt having means for obviating fatigue failure of the tractive links of the belt resulting from the repeated elastic deformation of the tractive links which occurs when the belt travels around lateral curves. More specifically, the invention concerns a flat wire conveyor belt having a plurality of slotted bar links positioned along the edges of the belt adjacent the tractive links thereof, which bar links carry substantially the entire tractive load of the belt as it travels around lateral curves to thus substantially eliminate elastic deformation and resultant fatigue failure of the tractive links.

Description of the prior art

Flatwire conveyor belts are well known as exemplified by Bechtel Patent 2,872,023. Generally, such belts comprise a plurality of tractive links which are formed to provide a plurality of longitudinally extending tractive members having slots therethrough. A plurality of tractive cross pins extend through the slots for slidably interconnecting the links.

The tractive members of each link are connected by transversely extending connecting members which form with the tractive members a plurality of wedge-shaped segments. The segments defined by each link may be nestably received within the segments defined by the longitudinally adjacent links, permitting the belt to collapse longitudinally.

When the belt travels around a lateral curve, it collapses longitudinally in a graduated manner across its width. The segments nearer the inner concave edge of the belt are nestably received further within the longitudinally adjacent segments than are the segments positioned progressively closer to the outer convex edge of the belt. As a result, when the belt travels around lateral curves the entire tractive load of the belt is carried by a relatively few of the tractive members which are positioned nearest the outer edge thereof.

It has been found that when this occurs the tractive and connecting members forming the outer portion of each tractive link are subjected to bending forces which cause elastic deformation or flexure of the link, particularly at the junctures between the tractive and connecting members. The repeated imposition of such forces and the resulting elastic deformation frequently induces fatigue failure of the tractive links at the aforementioned junctures.

One solution to this problem is disclosed in Roinestad Patent 3,261,451. This patent teaches that by tapering the slots in the tractive members through which the cross pins extend, the elastic deformation experienced by the tractive links incident to travel of the belt around lateral curves will be distributed over a larger surface area of the links to reduce localized fatigue failure at the junctures between the tractive and connecting members. While this solution has proved satisfactory for some conveyor belt installations, it has not obviated fatigue failure of the tractive links in installations where the belt carries heavy tractive loads along a tortuous path.

Summary of invention

The present invention offers an improved solution to the problem of fatigue failure of the tractive links of a flat wire conveyor belt by providing means other than the tractive links or carrying the tractive load of the belt when the belt travels around lateral curves. Such means comprise a plurality of slotted bar links which are positioned adjacent the tractive links along the edges of the belt and which are connected to the belt by the cross pins which interconnect the tractive links.

Generally described, a preferred embodiment of the invention comprises: a plurality of transversely disposed tractive links of flat wire each integrally including a plurality of laterally spaced substantially longitudinally disposed tractive members and a plurality of transversely disposed connecting members each connecting adjacent ones of said tractive members, adjacent ones of said connecting members extending between opposite ends of said tractive members so that the tractive and connecting members of each tractive link form a plurality of alternating oppositely opening wedge-shaped segments, each of said tractive members having a pair of longitudinally spaced first openings extending laterally therethrough, at least one of said first openings in each tractive member forming a longitudinally extending first slot; a plurality of pivotal tractive cross pins extending through said first openings to interconnect the tractive links, said cross pins being slidable along said first slots to permit longitudinal collapsing of the belt transversely thereof during travel of the belt around lateral curves with the wedge-shaped segments formed by one tractive link being nestably received within the segments formed by the longitudinally adjacent tractive links; and a plurality of substantially longitudinally disposed bar links independent of the tractive links and positioned adjacent thereto along each edge of the belt, each of said bar links having a pair of longitudinally spaced second openings extending laterally therethrough, said cross pins extending through said second openings to connect the bar links to the belt, at least one of said second openings in each bar link forming a longitudinally extending second slot to permit said longitudinal collapsing of the belt, the outer ends of said first and second openings defining first and second bearing surfaces, respectively, for engaging the cross pins, the longitudinal spacing between said first bearing surfaces of each tractive member being correlated with the longitudinal spacing between said second bearing surfaces of each bar link so that the tractive members carry a substantial portion of the tractive load of the belt when the belt travels along a substantially straight path but the bar links disposed along the outer convex edge of the belt carry most of the tractive load when the belt travels around lateral curves, thereby minimizing flexure and resultant fatigue failure of the tractive links.

The tractive links of a flat wire conveyor belt constructed in this manner will experience virtually no elastic deformation and resultant fatigue failure incident to travel of the belt around lateral curves.

With the foregoing in mind, it is an object of the present invention to provide a flat wire conveyor belt having means for obviating fatigue failure of the tractive links of such belt resulting from the repeated imposition of bending forces on the links when the belt travels around lateral curves.

It is a further object of the invention to provide a flat wire conveyor belt having slotted bar links positioned along the edges of such belt adjacent the tractive links thereof, which bar links carry most of the tractive load of the belt when it travels around lateral curves.

These and other objects of the invention will become apparent from a consideration of the detailed description of a preferred embodiment thereof given in connection with the following drawings.

Description of the preferred embodiment

Figure 1:
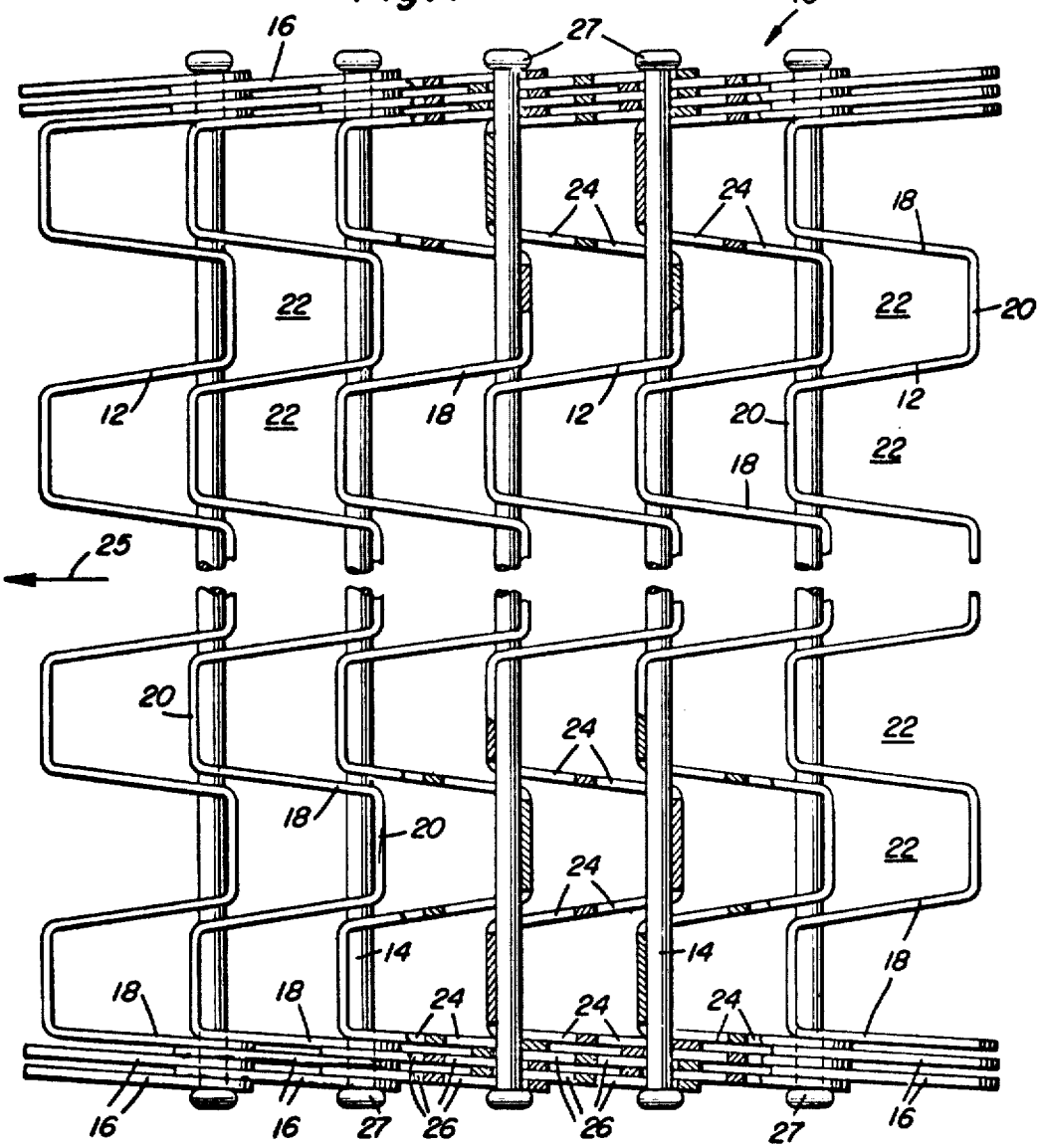
FIG. 1 is a plan view of a preferred embodiment of the flat wire conveyor belt of the invention showing the relationship of the structure elements of the belt when it travels along a substantially straight path, with portions of the belt being shown in section.
Figure 2:
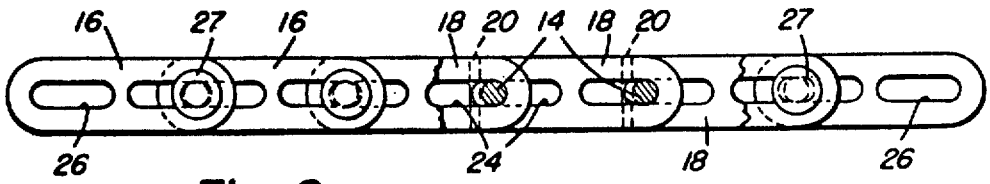
FIG. 2 is an elevational view of the conveyor belt shown in FIG. 1, with portions of the belt being shown in section.
Figure 3:
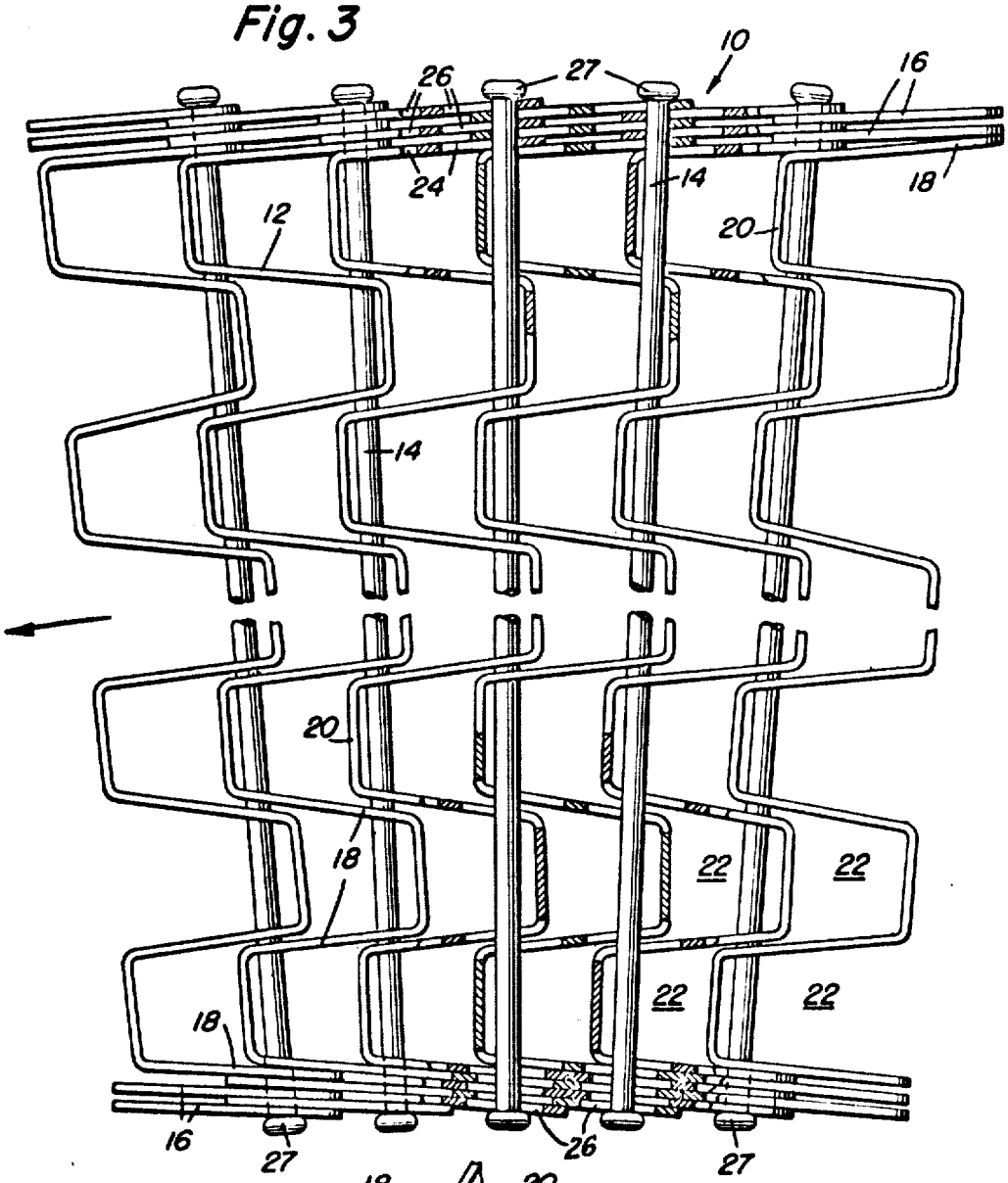
FIG. 3 is a plan view of the conveyor belt shown in FIG. 1 showing the relationship of the structural elements of the belt when it travels around a lateral curve, with portions of the belt being shown in section.

A preferred embodiment of the flat wire conveyor belt of the invention is designated in FIGS. 1 and 3 by reference numeral 10. Basically, conveyor belt 10 comprises a plurality of transversely disposed tractive links 12, a plurality of pivotal tractive cross pins 14 which interconnect the tractive links, and a plurality of substantially longitudinally disposed bar links 16 positioned adjacent tractive links 12 along each edge of belt 10 and connected to the belt by cross pins 14.

Tractive links 12 are fabricated from continuous strips of flat wire and are formed to provide a plurality of integral tractive wire members 18 which extend substantially longitudinally of belt 10. Adjacent ones of the tractive members are connected by integral connecting members 20 which extend substantially transversely of the belt. As shown in FIGS. 1 and 3, adjacent ones of the connecting members extend between opposite ends of the tractive members and the tractive members are slightly laterally inclined so that the tractive and connecting members of each tractive link 12 form a plurality of alternating oppositely opening wedge-shaped segments 22.

Each tractive member 18 has a pair of longitudinally spaced, longitudinally extending slots 24 extending laterally therethrough. Cross pins 14 extend through slots 24 to interconnect tractive links 12 and are slidable therealong to permit belt 10 to collapse longitudinally, with the wedge-shaped segments 22 defined by one tractive link being nestably received within the segments defined by the longitudinally adjacent tractive links, as shown in FIG. 3.

Alternatively, the longitudinally spaced openings in the tractive members may comprise a single longitudinally extending slot and a circular hole, as shown in the aforementioned Bechtel patent, instead of the two longitudinally extending slots 24 employed in the preferred embodiment of the conveyor belt of the invention illustrated in the drawings. In either instance, the belt is permitted to collapse longitudinally incident to the sliding of cross pins 14 along the slots.

When belt 10 travels along a substantially straight path, as shown in FIG. 1, it extends longitudinally until cross pins 14 engage the bearing surfaces formed by the outer ends of the openings in tractive members 18. In the illustrated preferred embodiment of the invention, the outer ends of slots 24 extend slightly into the adjacent connecting members 20 so that when the belt is fully extended and cross pins 14 are engaged with the outer ends of the slots, the cross pins will abut the flat inner surfaces of the connecting members. As will be apparent, when the cross pins and tractive links are so disposed the tractive load will be substantially equally distributed between the tractive members 18 of each tractive link 12.

The normal direction of belt travel is indicated by arrow 25 in FIG. 1 but it is to be understood that the belt can just as easily travel in the opposite direction.

When belt 10 travels around a lateral curve, as shown in FIG. 3, it collapses longitudinally in a graduated manner across the width thereof with the segments 22 nearer the inner concave edge of the belt being nestably received further within the longitudinally adjacent segments than the segments progressively closer to the outer edge of the belt. As a result of such graduated collapsing, cross pins 14 slide away from the outer ends of slots 24 and the inner surfaces of the adjacent connecting members 20 which are nearest the inner edge of the belt so that the tractive members 18 nearest the inner edge of the belt carry substantially none of the tractive load. Consequently, in the absence of bar links 16, the tractive members nearest the outer edge of the belt would carry substantially the entire tractive load. It has been found that when this occurs the tractive members 18 and connecting members 20 nearest the outer edge of the belt will be subjected to bending forces which cause tractive links 12 to elastically deform or flex, particularly at the junctures between the tractive and connecting members. Repeated elastic deformation of the tractive links induces fatigue failure at the aforementioned junctures, necessitating frequent replacement of the links.

This problem is obviated by bar links 16, which, similarly to tractive links 12, preferably are fabricated from flat wire. As shown in the drawings, the bar links are substantially longitudinally disposed and are positioned adjacent tractive links 12 along each edge of belt 10. Bar links 16 each have a pair of longitudinally spaced, longitudinally extending slots 26 extending laterally therethrough through which cross pins 14 extend for connecting the bar links to the belt. The cross pins are transversely restrained by appropriate means, such as by enlarged head portions 27.

Alternatively, the longitudinally spaced openings in the bar links may comprise a single longitudinally extending slot and a circular hole, similar to the aforementioned alternative openings which may be employed in the tractive members. The slots in the bar links, similarly to the slots in the tractive members permit the belt to collapse longitudinally.

The bar links will carry a tractive load when the cross pins engage the bearing surfaces formed by the outer ends of the openings therein. In the preferred embodiment of the invention, this occurs when cross pins 14 engage the bearing surfaces formed by the outer ends of slots 26.

The longitudinal spacing between the bearing surfaces of each bar link is correlated with the longitudinal spacing between the aforementioned bearing surfaces of each tractive member so that when the belt travels along a substantially straight path most of the tractive load of the belt will be carried by the tractive members and when the belt travels around a lateral curve a substantial portion of the tractive load will be carried by the bar links disposed along the outer convex edge of the belt.

Figure 4:
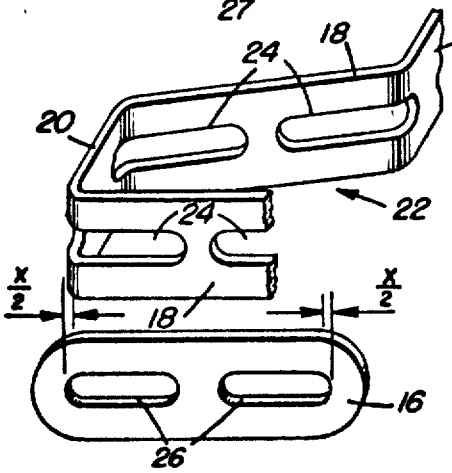
FIG. 4 is an enlarged perspective view of one of the bar links and a portion of one of the tractive links of the conveyor belt shown in FIG. 1.

Generally, the spacing between the bearing surfaces of each bar link should be at least as great, and preferably be greater than the spacing between the bearing surfaces of each tractive member. As shown in FIG. 4, in the preferred embodiment of the invention the longitudinal spacing between the bearing surfaces of each bar link is greater than the longitudinal spacing between the bearing surfaces of each tractive member by a distance x. This longitudinal spacing differential need not be great and preferably is only a few thousandths of an inch.

As will be evident from this description, when belt 10 travels along a substantially straight path, due to the aforementioned spacing differential, substantially none of the tractive load will be borne by bar links 16. However, when the belt travels around a lateral curve and collapses longitudinally in a graduated manner transversely thereof, cross pins 14 will slide away from the outer ends of slots 24 and the inner surfaces of connecting members 20 across the entire width of the belt, and will engage the bearing surfaces formed by the outer ends of slots 26 in the bar links 16 which are disposed at the outer convex edge of the belt. When this occurs the tractive load will be transferred from the tractive links to the bar links and the latter will carry the entire tractive load as belt 10 travels around the curve.

By spacing the bearing surfaces of each bar link a greater distance apart than the bearing surfaces of each tractive member so that the bar links carry substantially none of the tractive load of the belt when it travels along a straight path, the bar links do not continuously subject the ends of cross pins 14 to concentrated bending forces and the cross pins are less likely to fail. However, the longitudinal spacing differential between the respective bearing surfaces, distance *x*, should not be too great or the bearing surfaces formed by the outer ends of slots 26 in the bar links will not be engaged by cross pins 14 when the belt travels around lateral curves.

In the preferred embodiment of the invention a plurality of bar links 16 are positioned adjacent tractive links 12 along each edge of belt 10. However, the bar links may be positioned along only one edge of the belt if, for example, the path of the belt is such that only one edge thereof is primarily disposed on the outside of the lateral curves negotiated by the belt.

The bar links are arranged in longitudinally extending rows with each of the slots 26 in each bar link longitudinally overlapping one of the slots 26 in one of the longitudinally adjacent bar links. The preferred embodiment of the invention shown in the drawings has two such rows positioned along each edge of the belt to provide a structure which is suitable for most conveyor belt installations.

While the foregoing constitutes a detailed description of a preferred embodiment of the invention it is realized that various modifications thereof will occur to those skilled in the art. Therefore, the scope of the invention is to be limited solely by the scope of the appended claims.

We claim:

1. A flat wire conveyor belt comprising:

a plurality of transversely disposed tractive links of flat wire each integrally including a plurality of laterally spaced substantially longitudinally disposed tractive members and a plurality of transversely disposed connecting members each connecting adjacent ones of said tractive members, adjacent ones of said connecting members extending between opposite ends of said tractive members so that the tractive and connecting members of each tractive link form a plurality of alternating oppositely opening nestable segments, each of said tractive members having a pair of longitudinally spaced first openings extending laterally therethrough, at least one of said first openings in each tractive member forming a longitudinally extending first slot;

a plurality of pivotal tractive cross pins extending through said first openings to interconnect the tractive links, said cross pins being slidable along said first slots to permit longitudinal collapsing of the belt during travel thereof around lateral curves, said longitudinal collapsing being graduated transversely thereof with the segments formed by one tractive link being nestably received within the segments formed by the longitudinally adjacent tractive links; and a plurality of substantially longitudinally disposed bar links independent of the tractive binks, said bar links being positioned adjacent the tractive links and arranged in at least one longitudinally extending row along each edge of the belt, each of said bar links having a pair of longitudinally spaced second openings extending laterally therethrough, said cross pins extending through said second openings to connect the bar links to the belt, at least one of said second openings in each bar link forming a longitudinally extending second slot to permit said longitudinal collapsing of the belt, the outer ends of said first and second openings forming first and second bearing surfaces, respectively, for engaging the cross pins, the longitudinal spacing between said first bearing surfaces of each tractive member being correlated with the longitudinal spacing between said second bearing surfaces of each bar link so that the tractive members carry a substantial tractive load when the belt travels along a substantially straight path but the bar links disposed along the outer convex edge of the belt carry a substantial tractive load when the belt travels around lateral curves, thereby minimizing flexure and resultant fatigue failure of the tractive links.

2. A conveyor belt as recited in claim 1, wherein a plurality of said rows of bar links are positioned along each edge of the belt.

3. A conveyor belt as recited in claim 1, wherein the longitudinal spacing between said second bearing surfaces of each bar link is at least as great as the longitudinal spacing between said first bearing surfaces of each tractive member.

4. A conveyor belt as recited in claim 3, wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.

5. A conveyor belt as recited in claim 1, wherein said corrleation between the respective spacing of said first and second bearing surfaces is such that substantially all of the tractive load of the belt is carried by the bar links disposed along the outer convex edge of the belt when the belt travels around lateral curves.

6. A conveyor belt as recited in claim 5, wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.

7. A conveyor belt as recited in claim 1, wherein each of said first and second openings forms a longitudinally extending slot.

*8. A flat wire conveyor belt comprising:*

*a plurality of transversely disposed tractive links of flat wire each integrally including a plurality of laterally spaced substantially longitudinally disposed tractive members and a plurality of transversely disposed connecting members each connecting adjacent ones of said tractive members, adjacent ones of said connecting members extending between opposite ends of said tractive members so that the tractive and connecting members of each tractive link form a plurality of alternating oppositely opening nestable segments, each of said tractive members defining a pair of opposed, longitudinally spaced first bearing surface and a first slot beginning laterally therethrough and longitudinally thereof from one of said first bearing*

*surfaces toward the other of said first bearing surfaces;*

*a plurality of tractive cross pins extending through the tractive members for pivotally interconnecting the tractive links, said cross pins being engageable with said first bearing surfaces and also being slidable along said first slots to permit longitudinal collapsing of the belt during travel thereof around lateral curves, said longitudinal collapsing being graduated transversely thereof with a first outer edge of the belt being convex and a second inner edge of the belt being concave and with the segments formed by one tractive link being nestably received within the segments formed by the longitudinally adjacent tractive links; and*

*a plurality of substantially longitudinally disposed bar links independent of the tractive links, said bar links being positioned adjacent the tractive links and arranged in at least one longitudinally extending row along said first edge of the belt, each of said bar links defining a pair of opposed, longitudinally spaced second bearing surfaces, said cross pins extending through said bar links to connect the bar links to the belt, said cross pins being engageable with said second bearing surfaces, the longitudinal spacing between said first bearing surfaces of each tractive member being correlated with the longitudinal spacing between said second bearing surfaces of each bar link so that the tractive members carry a substantial tractive load when the belt travels along a substantially straight path but the bar links carry a substantial tractive load when the belt travels around lateral curves, thereby minimizing flexure and resultant fatigue failure of the tractive links.*

*9. A conveyor belt as recited in claim 8, wherein a plurality of said rows of bar links are positioned along said first edge of the belt.*

*10. A conveyor belt as recited in claim 8, wherein the longitudinal spacing between said second bearing surfaces of each bar link is at least as great as the longitudinal spacing between said first bearing surfaces of each tractive member.*

*11. A conveyor belt as recited in claim 10 wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.*

*12. A conveyor belt as recited in claim 8, wherein said correlation between the respective spacing of said first and second bearing surfaces is such that substantially all of the tractive load of the belt is carried by the bar links when the belt travels around lateral curves.*

*13. A conveyor belt as recited in claim 12, wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.*

*14. A flat wire conveyor belt comprising:*

*a plurality of transversely disposed tractive links of flat wire each integrally including a plurality of laterally spaced substantially longitudinally disposed tractive members and a plurality of transversely disposed connecting members each connecting adjacent ones of said tractive members, adjacent ones of said connecting members extending between opposite ends of said tractive members so that the tractive and connecting members of each tractive link form a plurality of alternating oppositely opening nestable segments, each of said tractive members defining a pair of opposed, longitudinally spaced first bearing surfaces and a first slot extending laterally therethrough and longitudinally thereof from one of said first bearing surfaces toward the other of said first bearing surfaces;*

*a plurality of tractive cross pins extending through the tractive members for pivotally interconnecting the tractive links, said cross pins being engageable with said first bearing surfaces and also being slidable along said first slots to permit longitudinal collapsing of the belt during travel thereof around lateral curves, said longitudinal collapsing being graduated transevrsely thereof with the segments formed by one tractive link being nestably received within the segments formed by the longitudinally adjacent tractive links; and*

*a plurality of substantially longitudinally disposed bar links independent of the tractive links, said bar links being positioned adjacent the tractive links and arranged in at least one longitudinally extending row along each edge of the belt, each of said bar links defining a pair of opposed, longitudinally spaced second bearing surfaces and a second slot extending laterally therethrough and longitudinally thereof from one of said second bearing surfaces toward the other of said second bearing surfaces, said cross pins extending through said bar links to connect the bar links to the belt, said cross pins being engageable with said second bearing surfaces and also being slidable along said second slots to permit said longitudinal collapsing of the belt, the longitudinal spacing between said first bearing surfaces of each tractive member being correlated with the longitudinal spacing between said second bearing surfaces of each bar link so that the tractive members carry a substantial tractive load when the belt travels along a substantially straight path but the bar links disposed along the outer convex edge of the belt carry a substantial tractive load when the belt travels around lateral curves, thereby minimizing flexure and resultant fatigue failure of the tractive links.*

*15. A conveyor belt as recited in claim 14, wherein a plurality of said rows of bar links are positioned along each edge of the belt.*

*16. A conveyor belt as recited in claim 14, wherein the longitudinal spacing between said second bearing surfaces of each bar link is at least as great as the longitudinal spacing between said first bearing surfaces of each tractive member.*

*17. A conveyor belt as recited in claim 16, wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.*

*18. A conveyor belt as recited in claim 14, wherein said correlation between the respective spacing of said first and second bearing surfaces is such that substantially all of the tractive load of the belt is carried by the bar links disposed along the outer convex edge of the belt when the belt travels around lateral curves.*

*19. A conveyor belt as recited in claim 18, wherein the longitudinal spacing between said second bearing surfaces of each bar link is slightly greater than the longitudinal spacing between said first bearing surfaces of each tractive member so that the bar links carry substantially none of the tractive load of the belt when the belt travels along a substantially straight path.*

*20. A conveyor belt as recited in claim 8 wherein said bar links are arranged in at least one longitudinally extending row along both edges of said belt, each of said bar links along said second edge of the belt defining a second slot extending laterally therethrough and longitudinally thereof from one of said second bearing surfaces toward the other of said second bearing surfaces, said cross pins being slidable along said second slots to permit said longitudinal collapsing of the belt.*

*21. A conveyor belt as recited in claim 8 wherein each of said bar links defines a second slot extending longi-*

*tudinally thereof from one of said second bearing surfaces toward the other of said second bearing surfaces, said cross pins being slidable along said second slots to permit longitudinal collapsing of said first edge of the belt.*

*22. A conveyor belt as recited in claim 8, wherein said first slot terminates between said first bearing surfaces.*

*23. A conveyor belt as recited in claim 21, wherein said second slot terminates between said second bearing surfaces.*

*24. A conveyor belt as recited in claim 14, wherein said first slot terminates between said first bearing surfaces and said second slot terminates between said second bearing surfaces.*

References Cited

The following references, cited by the Examiner, are of record in the patented file of this patent or the original patent.

UNITED STATES PATENTS

| | | | |
|---|---|---|---|
| 2,862,609 | 12/1958 | Bechtel | 198—193 |
| 3,237,756 | 3/1966 | Pulver | 198—195 |
| 3,261,451 | 7/1966 | Roinestad | 198—193 |
| 2,872,023 | 2/1959 | Bechtel | 198—182 |

RICHARD E. AEGERTER, Primary Examiner

U.S. Cl. X.R.

198—181

UNITED STATES PATENT OFFICE
CERTIFICATE OF CORRECTION

PATENT NO. : Re. 27,690
DATED : July 3, 1973
INVENTOR(S) : Gerald C. Roinestad et al It is certified that error appears in the above-identified patent and that said Letters Patent are hereby corrected as shown below:

In claim 8, column 6, line 73, "surface" should be changed to --surfaces--; and in line 74, "beginning" should be changed to --extending--.

Signed and Sealed this
Third Day of May 1977

[SEAL]

*Attest:*

RUTH C. MASON
*Attesting Officer*

C. MARSHALL DANN
*Commissioner of Patents and Trademarks*